Feb. 13, 1973   R. E. FOX   3,716,212
SPRAYER BOOM LEVELING AND FOLDING APPARATUS
Filed Sept. 27, 1971
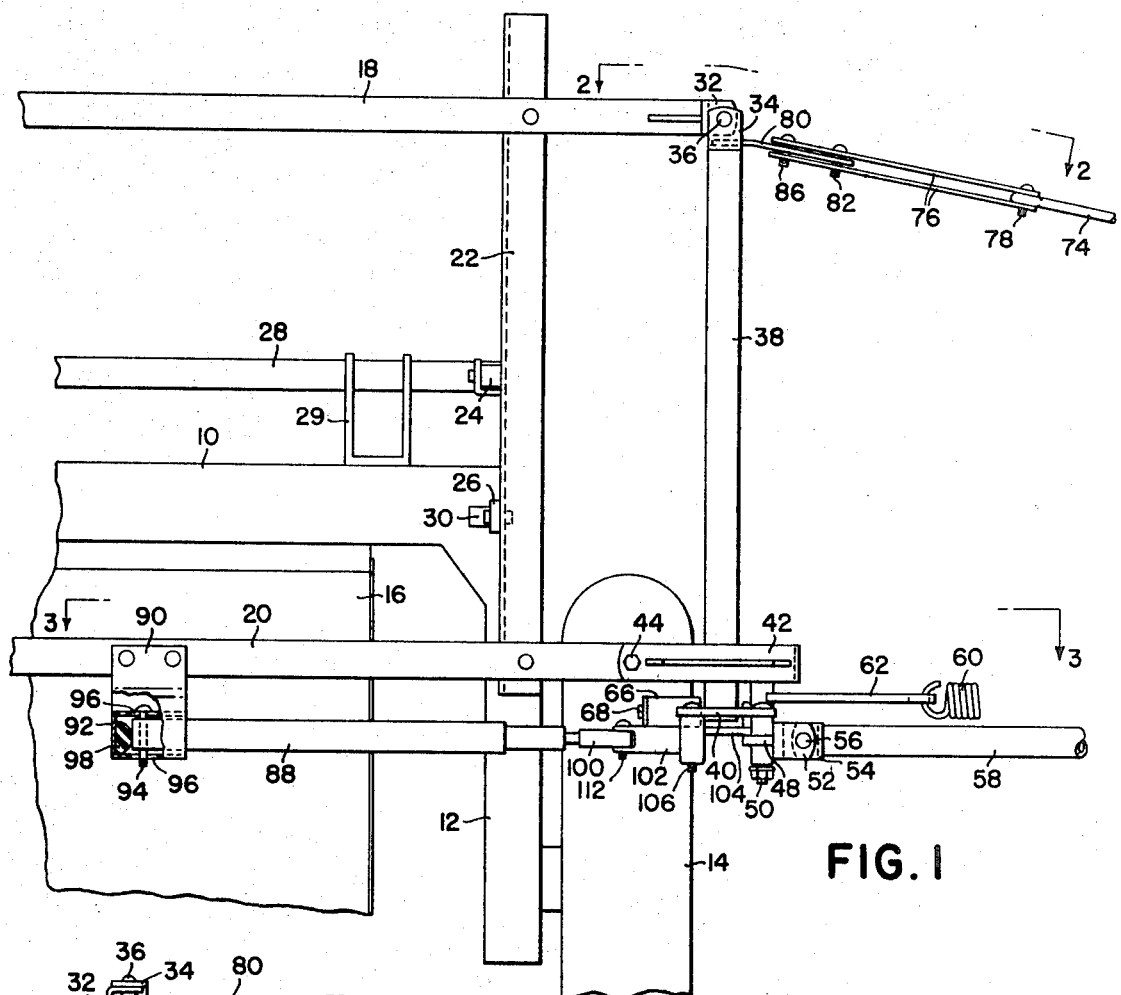
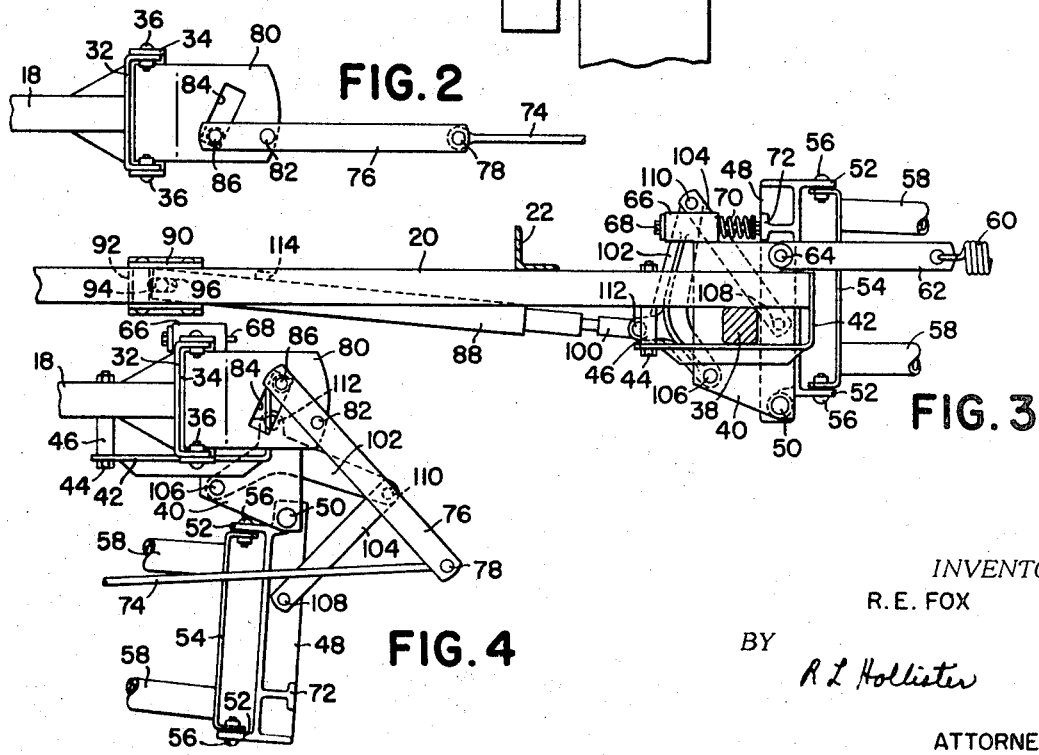
INVENTOR.
R. E. FOX
BY
R L Hollister
ATTORNEY

United States Patent Office 3,716,212
Patented Feb. 13, 1973

3,716,212
SPRAYER BOOM LEVELING AND FOLDING
APPARATUS
Robert Eugene Fox, Minburn, Iowa, assignor to Deer &
Company, Moline, Ill.
Filed Sept. 27, 1971, Ser. No. 183,879
Int. Cl. B05b 1/20
U.S. Cl. 248—278                                            13 Claims

ABSTRACT OF THE DISCLOSURE

A sprayer boom is pivotally connected to a generally upright support member for movement about an upright axis between working and transport positions. The support member is pivotally connected at its upper end to a boom mounting frame. A hydraulic cylinder is interconnected with the support member and boom to move the support member outwardly upon initial extension and to fold the boom from its working position to its transport position upon additional extension. The construction permits the use of a single cylinder to control both the leveling and folding of the sprayer boom.

BACKGROUND OF THE INVENTION

The present invention relates generally to sprayer booms, and more particularly relates to novel leveling and folding apparatus which permits the use of a single cylinder to control both the leveling and folding of the boom and which will fold the boom through 180°.

Due to the extreme lengths now employed in sprayer booms, it has been found to be necessary to construct the booms from a plurality of sections, a center section or mounting frame being carried by a vehicle and the outer sections being pivotally mounted on a center section for movement between the extended working positions and folded transport positions in which they extend generally along the vehicle or across one end of the vehicle. The outer sections of the boom are also mounted for movement about a horizontal axis so that the outer ends of the boom can be raised and lowered. The folding of the outer boom sections facilitates transport of the boom and the raising and lowering of the outer ends of the outer boom sections make it possible to level the boom with respect to the ground surface beneath the boom so that as the vehicle carrying the boom travels over an unlevel ground surface, one end of the boom will not be lowered to the point where the spray material is applied to narrow bands leaving untreated strips while the opposite end extends upwardly a sufficient distance to cause a great amount of spray drift.

In the past, the folding and leveling functions of a boom each required a separate hydraulic cylinder and directional control valve for each of the outer boom sections. More recently, boom folding and leveling apparatus have been designed which permitted the folding and leveling functions of each outer boom section to be controlled by a single valve, but the two functions still required separate hydraulic cylinders.

SUMMARY OF THE INVENTION

The principal object of the present invention is to provide sprayer boom folding and leveling apparatus which requires only a single cylinder to both level and fold the sprayer boom.

Another object of the present invention is to provide an improved mounting and folding linkage for a sprayer boom which will fold the boom through 180° and raise the outer end of the boom so that when folded, the boom will extend diagonally across one end of the vehicle on which it is mounted.

Yet another object of the present invention is to provide a boom leveling and folding apparatus which utilizes a single cylinder for both leveling and folding the boom, and which will fold the boom through 180° so that, when in the transport position, the boom will extend across one end of the vehicle on which it is mounted.

The above objects and additional objects and advantages within the spirit and scope of the invention will become apparent, along with the details of construction of a preferred embodiment of the invention, to those skilled in the art from a reading of the following detailed description when taken in conjunction with the accompanying drawing.

BRIEF DESCRIPTION OF THE DRAWING

In the drawing:

FIG. 1 is a fragmentary rear elevational view of a sprayer boom embodying the folding and leveling apparatus according to the present invention, the boom being shown in its working position;

FIG. 2 is a view taken substantially along the line 2—2 of FIG. 1;

FIG. 3 is a view taken substantially along the line 3—3 of FIG. 1; and

FIG. 4 is a view similar to FIG. 3 but illustrating the parts when the boom is in its transport position and a few parts being omitted.

DESCRIPTION OF THE PREFFERRED EMBODIMENT

In the following description and in the drawing, only one-half of a sprayer is described and illustrated, the other half being omitted for simplicity purposes since it is similar in all aspects to the disclosed half, and the description of the disclosed half also serves as a description of the undisclosed half.

Referring now to the drawing, the spraying apparatus is illustrated as being mounted on the rear portion of a special spraying vehicle. The vehicle includes a transversely extending rear beam assembly 10 which may be an integral part of the vehicle chassis and a drop housing 12 secured to each end of the beam assembly 10. The rear portion of the vehicle is carried by ground wheels 14 rotatably mounted on the lower portion of the drop housings while the forward portion of the vehicle is supported on an additional wheel (undisclosed) in any suitable manner. The vehicle also includes a solution tank 16 which is carried under and secured to the chassis in any suitable manner.

The spraying apparatus includes a generally vertically extending boom mounting frame made up of upper and lower transversely extending frame members 18 and 20 which are interconnected by vertically extending frame members 22. The mounting frame is secured to the vehicle through pairs of upper and lower arms 24 and 26 which form parallel linkages. The inner ends of arms 24 may be formed as an integral part of a rockshaft 28 supported on the beam assembly 10 by brackets 29, and the inner ends of the arms 26 are pivotally secured to brackets 30 mounted on the drop housings 12. The other ends of the arms 24 and 26 are pivotally secured to the vertical frame members 22 so that by rotating the rockshaft 28, the entire mounting frame is raised and lowered while maintaining its vertical attitude.

A C-shaped bracket member 32 has its bight secured to the outer end of the upper frame member 18 and an additional C-shaped bracket member 34 has its legs pivotally connected to the legs of the bracket member 32 by pivot bolts 36. The upper end of an elongated generally upright support member 38 is secured to the bight of the bracket member 34 near the rearwardmost end thereof so that the support member 38 is situated to the rear of the mounting frame. The support member 38 extends along the rear side of the frame member 20 and has a support plate 40 secured to the lower end portion thereof below the frame member 20. An L-shaped bracket 42 has its short leg secured to the end of the lower frame member 20 and its long leg extending back along the lower frame member 20 in spaced parallel relation thereto. A bolt 44 extends through the end of the long leg of the L-shaped bracket 42 and the frame member 20 to secure the end of the L-shaped bracket to the frame member 20, and a spacer 46 is mounted on the bolt 44 between the L-shaped bracket 42 and the frame member 20 to maintain the long leg of the L-shaped bracket 42 in its spaced parallel relationship with the frame member 20. The lower end of the support member 38 extends between the lower frame member 20 and the L-shaped bracket 42 so that the short leg of the L-shaped bracket 42 and the spacer 46 provide abutments which limit the lateral pivotal movement of the support member 38.

An elongated pivot bracket 48 has one end connected to the outer rear corner of the support plate 40 for movement in a generally horizontal plane about an upright axis defined by a pivot bolt 50. The pivot bracket 48 includes a pair of spaced outwardly extending ears 52 and the legs of an additional C-shaped bracket member 54 forming the inner end of a boom are pivotally connected thereto by bolts 56. The pivot bolts 56 define a generally horizontally disposed axis for the boom.

In addition to the C-shaped bracket member 54, the boom includes a pair of boom bars 58 which have their inner ends secured to the bight of the C-shaped bracket member 54 and which converge outwardly and have their outer ends connected together in any suitable manner. A spring 60 has one end anchored to the boom bars in any conventional manner and its opposite end anchored to one end of a link 62 which has its opposite end connected to the outer front corner of the support plate 40 for movement in a generally horizontal plane about an upright axis defined by a pivot bolt 64. The pivot bolt 64 is positioned slightly forwardly of the longitudinal centerline of the boom when the boom is in its working position illustrated in FIGS. 1 and 3 so that the spring 60 provides a bias on the boom to move the boom toward and hold the boom in the working position illustrated in FIGS. 1 and 3.

A spring housing 66 is secured along the front edge of the support plate 40 and has an open outer end. A bolt 68 extends through the spring housing and serves to mount and provide a precompression on a spring 70. An abutment 72 on the pivot bracket 48 contacts the head of the bolt 68 when the boom is in its working position so that the two springs 60 and 70 yieldably hold the boom in its working position.

The boom is prevented from dropping about the axis defined by the pivot bolts 56 by a boom brace 74. The outer end of the boom brace 74 is connected to the boom remotely from the inner end thereof in any suitable manner, and the inner end is pivotally mounted between a pair of vertically spaced links 76 by a pivot pin 78. A plate 80 is secured to the bight of the C-shaped bracket member 34 between the legs thereof and extends outwardly therefrom. The links 76 extend above and below the plate 80 and have an intermediate portion pivotally connected to an outer rear portion of the plate 80 by a pivot pin 82. The plate 80 is provided with an elongated opening 84 and a pin 86 extends through the two links 76 and the opening 84. The ends of the opening 84 and the pin 86 limit the movement of the links 76 to approximately 45° so that the links 76 cannot move beyond the two extreme positions illustrated in FIGS. 2 and 4. Due to the fact that the boom brace 74 extends from the upper end of the support member 38 downwardly and outwardly to its connection with the boom, the pivot pins 78 and 82 are at a slight angle to the vertical, but the angle is slight and hereinafter these pivot pins will be described as generally upright pivot pins.

The described sprayer boom can be leveled with respect to the ground surface by pivoting the support member 38 laterally inwardly or outwardly about the axis defined by the pivot bolts 36 and can also be moved between the working position illustrated in FIG. 3 and the transport position illustrated in FIG. 4 by pivoting about the bolt 50. Both the leveling and folding of the boom are accomplished by a single hydraulic cylinder 88.

To mount the cylinder 88, a U-shaped bracket 90 has its legs clamped to the lower frame member 20 and an L-shaped bracket 92 is secured within the U-shaped bracket 90 so that the two brackets 90 and 92 form a laterally outwardly open socket. The anchor end of the cylinder 88 extends within the socket and a pin 94 extends through elongated openings 96 provided in the bight of the U-shaped bracket 90 and one leg of the bracket 96 and also through an opening provided in the anchor end of the cylinder 88. The elongated openings 96 and the pin 94 provide a lost-motion connection between the lower frame member 20 and the cylinder 88. An elastomer 98 is mounted on the L-shaped bracket 92 and is in engagement with the anchor end of the cylinder 88 for a purpose which will be explained in the description of the operation.

The rod 100 of the cylinder 88 is connected to both the mounting plate 40 and the pivot bracket 48 by a pair of links 102 and 104. The link 102 is pivotally connected to the inner rear corner of the mounting plate 40 for movement in a horizontal plane about a generally upright axis defined by a pivot pin 106 and, when the boom is in its working position, extends to a position just forwardly of the inner front corner of the mounting plate 40. The link 104 is connected to an intermediate portion of the pivot bracket 48 for movement in a horizontal plane about an upright axis defined by a pivot pin 108. The free ends of the links 102 and 104 are interconnected for relative movement about an upright axis defined by a pivot pin 110. The rod 100 of the cylinder 88 is connected to an intermediate portion of the link 102 by a pivot pin 112.

The folding and leveling operations of the boom take place as follows. When the boom 88 is initially extended by supplying fluid pressure to the port 114 of the cylinder, the lower end of the support member 38 will be forced outwardly to raise the outer end of the boom. The reasons that the support member 38 will pivot about the axis defined by the bolts 36 rather than the boom pivoting about the upright axis 50 are threefold. First, the tension spring 60 provides a bias on the boom which tends to keep the boom in its extended position illustrated in FIGS. 1 and 3. Second, the pivot 82 for the links 76 is positioned both laterally outwardly and forwardly of the pivot pin 50 so that, as the boom initially moves from its working position to its transport position, the effective length of the brace for the boom is shortened and the boom must be raised about the horizontal axis defined by the pivot bolts 56. Third, the links 102 and 104 provide a negative mechanical advantage between the cylinder 88 and the pivot bracket 48 so that the cylinder 88 provides a greater force on the support plate 40 than on the pivot bracket 48.

When the lower end of the support member 38 contacts the short leg of the L-shaped bracket 42, continued extension of the cylinder 88 acts through the links 102 and 104 to move the pivot bracket 48 about the pivot 50 and hence the boom from the working position illustrated in FIGS. 1 and 3 toward the transport position illustrated in FIG. 4. As the boom initially moves from its working position, the links 76 will pivot about the pin 82 and, as previously explained, the position of the pin 82 with respect to the pivot pin 50 shortens the effective length of the brace 78 so that the outer end of the boom also moves upwardly. After the boom has been pivoted through approximately 45°, the pin 86 prevents additional movement of the links 76 and the brace 74 pivots about the pin 78. When the links 76 are no longer free to pivot with the boom and the brace 74 moves about the pivot 78, the effective length of the brace 78 is again shortened with respect to the boom and the upward movement of the outer end of the boom as the boom is moved towards its transport position is accelerated so that by the time the boom reaches the transport position illustrated in FIG. 4, it extends diagonally across the rear of the vehicle and above the opposite end of the mounting frame so that it will not interfere with a boom mounted on the opposite end of the inner frame.

As the boom is moved to the transport position, the link 62 pivots about the pin 64 until it contacts the support member 38. Due to the length of the link 62, the anchor point between the link 62 and the tension spring 60 will be positioned to the rear of the pivot 50 so that the spring 60 still provides a force on the boom which biases the boom towards the working position.

When the cylinder 88 is retracted by exhausting fluid through the port 114, the bias of the spring 60 tends to return the boom to its working position. Also, the weight of the boom acting on the brace 74 which is spaced from the pivot 50 aids the spring 60 in biasing the boom toward its working position. When the boom has reached its working position, the abutment 72 on the pivot bracket 48 contacts the bolt 68 and compresses the spring 70 which provides a cushioned stop for the pivotal movement of the boom.

Additional retraction of the cylinder 88 permits the support member 38 to pivot laterally inwardly under the weight of the boom so that the boom can be leveled to any desired position.

When the vehicle carrying the spraying apparatus is moving over rough terrain, the boom will tend to bounce and place a great deal of strain on the mounting frame, but the bouncing of the boom is cushioned by contact between the anchor end of the cylinder 88 and the elastomer 98.

While only a single preferred embodiment of the invention has been described and illustrated, various modifications will bcome apparent to those skilled in the art and can be made without departing from the underlying principles of the invention. Therefore, the invention should not be limited by the specific illustration and description, but only by the scope of the following claims.

I claim:

1. Spraying apparatus comprising: a vehicle; a mounting frame carried on the vehicle and having upper and lower portions; an elongated, generally upright boom support member having its upper end connected to the upper portion of the mounting frame for movement about a fore-and-aft extending axis; means on the mounting frame limiting pivotal movement of the support member; an elongated boom having an inner end pivotally interconnected with the lower end of the support member for movement about an upright axis between a first transversely extending working position and a second transport position; a brace member having an outer end secured to the boom remotely from the inner end thereof and an inner end secured to the upper end of the boom support member for pivotal movement about an upright axis; biasing means acting between the support member and a boom to normally hold the boom in the extended position; an extensible and retractable hydraulic cylinder having one end connected to the mounting frame and a second end interconnected with the inner end of the boom at a location spaced from the first-mentioned upright axis whereby, upon initial extension of the cylinder, the support member is pivoted about its fore-and-aft axis within the limits of the means limiting its pivotal movement and, upon additional extension of the cylinder, the boom is moved about its upright axis toward its second position.

2. The spraying apparatus set forth in claim 1 wherein the inner end of the boom includes a pair of bracket members pivotally interconnected for relative movement about an axis extending transversely to the longitudinal axis of the boom, one of the bracket members is secured to the boom and the other is pivotally connected to the lower end of the support member, and the upright axis of the brace member is offset from the upright axis of the boom in both the transverse and fore-and-aft directions to cause the boom to pivot upwardly about the axis of the bracket members upon movement of the boom from the first to the second positions.

3. The spraying apparatus set forth in claim 2 wherein the biasing means includes a tension spring having one end anchored to the boom and a second end interconnected with the lower end of the support member in a position spaced from the upright axis of the boom.

4. Spraying apparatus comprising: a vehicle; a mounting frame carried on the vehicle and including a generally upright support member pivotally mounted at its upper end for lateral movement with respect to the vehicle; means on the mounting frame limiting the movement of the support member; an elongated boom having an inner end pivotally connected to the lower end of the support member for movement about a generally horizontally disposed axis and an upright axis between a transversely extending working position and a transport position; an elongated boom brace having one end connected to the boom remotely from the inner end thereof and a second end pivotally connected to the upper end of the support member for movement about a generally upright axis which is spaced in both the lateral and fore-and-aft directions from the first-mentioned upright axis so that, upon movement of the boom from the working position to the transport position, the outer end of the boom is moved upwardly about the horizontally disposed axis; and an extensible and retractable hydraulic cylinder having one end connected to the mounting frame and a second end operatively interconnected with the boom and the lower end of the support member so that upon initial extension of the hydraulic cylinder the lower end of the supporting member is moved laterally outwardly to raise the outer end of the boom and upon continued extension of the hydraulic cylinder the boom is moved from the working position to the transport position.

5. Spraying apparatus as set forth in claim 4 wherein a resilient compressible member acts between the one end of the hydraulic cylinder and the mounting frame to cushion the boom as the vehicle moves across rough terrain.

6. Spraying apparatus as set forth in claim 5 wherein a bracket is secured to the mounting frame adjacent the one end of the hydraulic cylinder, the one end of the hydraulic cylinder is connected to the bracket through lost-motion connection means, and the resilient compressible member is an elastomer mounted on the bracket and engaging the one end of the hydraulic cylinder 7. Spraying apparatus as set forth in claim 4 wherein spring means act between the boom and the support member to bias the boom toward its working position, a compression spring is mounted on the support member in a position to be contacted by the boom when the boom is in the working position, whereby, when the boom is returned to its working position by the spring means upon retraction of the hydraulic cylinder, the boom contacts the compression spring and is cushioned thereby.

8. Spraying apparatus comprising: a vehicle; a mounting frame carried at one end of the vehicle and including upper and lower portions; an elongated boom having an inner end pivotally connected to the lower portion of the mounting frame for movement about a generally horizontally disposed axis and a first generally upright axis between a working position in which it extends laterally outwardly from the vehicle and a transport position in which it extends across the one end of the vehicle; a rigid link pivotally mounted adjacent one end of the upper portion of the mounting frame for limited movement about a second generally upright axis between a boom-working position in which it extends generally laterally outwardly from the vehicle and a second position displaced from the working position by approximately 45°; the second generally upright axis being horizontally spaced from the first generaly upright axis by a distance less than the length of the link and in a direction opposite to the general direction of movement of the boom upon initial movement of the boom from the working position; a boom brace having one end connected to the boom remotely from the inner end thereof and a second end pivotally connected to the free end of the link for movement about a third generally upright axis; a hydraulic cylineder having one end anchored to the mounting frame; and link means interconnecting the free end of the hydraulic cylinder and the boom to move the boom from its working position to its transport position upon extension of the hydraulic cylinder; whereby the relative positions of the three generally upright axes bias the boom toward its working position and, upon movement of the boom to its transport position, the changing geometry between the link and boom brace causes the boom to pivot upwardly about the generally horizontally disposed axis so that it extends generally diagonally across the one end of the vehicle 9. Spraying apparatus as set forth in claim 8 wherein the link means includes a first link member having one end pivotally connected to the lower portion of the mounting frame for movement about a fourth generally upright axis and a second link member having one end pivotally connected to the boom for movement about a fifth generally upright axis and a second end pivotally connected to the free end of the first link member for relative movement about a sixth generally upright axis, and the hydraulic cylinder is connected to an intermediate portion of the first link member.

10. Spraying apparatus comprising: a vehicle; a mounting frame carried at one end of the vehicle and including a generally upright support member pivotally mounted at its upper end for lateral movement with respect to the vehicle; means on the mounting frame limiting lateral movement of the support member; an elongated boom having an inner end pivotally connected to a lower portion of the support member for movement about a generally horizontally disposed axis and a first generally upright axis between a working position in which it extends laterally outwardly from the vehicle and a transport position in which it extends across the one end of the vehicle; a rigid link pivotally mounted adjacent one end to an upper portion of the support member for limited movement about a second generally upright axis between a boom-working position in which it extends generally laterally outwardly from the vehicle and a second position displaced from the boom-working position by approximately 45°; the second generally upright axis being horizontally spaced from the first generally upright axis by a distance less than the length of the link and in a direction opposite to the general direction of movement of boom upon initial movement of the boom from its working position; a boom brace having one end connected to the boom remotely from the inner end thereof and a second end pivotally connected to the free end of the link for movement about a third generally upright axis; a hydraulic cylinder having one end anchored to the mounting frame; and link means interconnected between the free end of the hydraulic cylinder, the lower end of the support member, and the boom to move the support member laterally outwardly upon initial extension of the hydraulic cylinder and to move the boom from its working position to its transport position upon continued extension of the hydraulic cylinder; whereby the single cylinder will function to level the boom and move the boom to its transport position, the relative positions of the three generally upright axes bias the boom toward its working position, and, upon movement of the boom to its transport position, the changing geometry between the link and boom brace cause the boom to pivot upwardly about the generally hori-zontally disposed axis so that it extends generally diagonally across the one end of the vehicle.

11. Spraying apparatus as set forth in claim 10 wherein the link means includes a first link member having one end pivotally connected to the lower portion of the support member for movement about a fourth generally upright axis and a second link member pivotally connected to the boom for movement about a fifth generally upright axis and a second end pivotally connected to the free end of the first link member for relative movement about a sixth generally upright axis, and the hydraulic cylinder is connected to an intermediate portion of the first link member.

12. Spraying apparatus comprising: a vehicle; a mounting frame carried at one end of the vehicle; a boom supported on the mounting frame for movement about an upright axis between a working position in which it extends laterally outwardly from the vehicle and a transport position in which it extends across the one end of the vehicle; a first link having one end pivotally connected to the mounting frame for movement about an upright axis horizontally spaced from the first-mentioned upright axis; a second link having one end pivotally connected to the boom for movement about an upright axis horizontally spaced from the first- and second-mentioned upright axes; pivot means interconnecting the free ends of the first and second links; and a hydraulic cylinder having one end pivotally connected to the mounting frame and a second end pivotally connected to an intermediate portion of the first link, whereby extension of the hydraulic cylinder acts through the links to move the boom about the first-mentioned upright axis from its working to its transport position.

13. Spraying apparatus comprising: a vehicle; a mounting frame carired at one end of the vehicle and including a generally upright support member pivotally mounted at its upper end for lateral movement with respect to the vehicle; means on the mounting frame limiting the lateral movement of the support member; an elongated boom pivotally connected to the support member for movement about an upright axis between a working position in which it extends laterally outwardly from the vehicle and a transport position in which it extends across the one end of the vehicle; a first link having one end pivotally connected to the support member for movement about an upright axis horizontally spaced from the first-mentioned upright axis; a second link having one end pivotally connected to the boom for movement about an upright axis horizontally spaced from the first- and second-mentioned upright axes; pivot means interconnecting the free ends of the first and second links; a hydraulic cylinder having one end pivotally connected to the mounting frame and a second end pivotally connected to an intermediate portion of the first link; and means interconnected between the boom and support member biasing the boom toward its working position; whereby initial extension of the hydraulic cylinder pivots the support member laterally outwardly to raise the outer end of the boom and additional extension of the hydraulic cylinder moves the boom about the first-mentioned upright axis from its working position to its transport position.

References Cited

UNITED STATES PATENTS

| | | | |
|---|---|---|---|
| 3,179,794 | 4/1965 | Hunt | 239—168 X |
| 3,329,030 | 7/1967 | Dijkhof | 239—167 X |
| 3,514,038 | 5/1970 | McQuinn | 239—165 |
| 3,544,009 | 12/1970 | Schlueter | 239—167 |
| 3,554,478 | 1/1971 | Sunderman | 248—278 |
| 3,587,624 | 6/1971 | Holloway | 137—344 |

J. FRANKLIN FOSS, Primary Examiner

U.S. Cl. X.R,

239—167; 248—16